United States Patent [19]

Yang

[11] Patent Number: 4,659,793

[45] Date of Patent: Apr. 21, 1987

[54] PREPARATION OF AQUEOUS SOLUTIONS OF COPOLYMERS OF DICARBOXYLIC ACIDS HAVING A LOW DICARBOXYLIC ACID MONOMER CONTENT

[75] Inventor: Mo-Shu Yang, Hixson, Tenn.

[73] Assignee: Alco Chemical Corporation, Chattanooga, Tenn.

[21] Appl. No.: 835,242

[22] Filed: Mar. 3, 1986

[51] Int. Cl.$^4$ .............................................. C08F 2/16
[52] U.S. Cl. ........................................ 526/91; 526/93
[58] Field of Search ............................. 526/91, 93, 94

[56] References Cited

U.S. PATENT DOCUMENTS

| | | | |
|---|---|---|---|
| 2,789,099 | 4/1957 | Rife | 526/194 |
| 3,129,195 | 4/1964 | June | 526/287 |
| 3,635,915 | 1/1972 | Gale | 526/317 |
| 3,806,367 | 4/1974 | Lange et al. | 134/3 |
| 3,898,037 | 8/1975 | Lange et al. | 252/149 |
| 4,306,048 | 12/1981 | Yoshida | 526/193 |
| 4,314,044 | 2/1982 | Hughes | 526/91 |
| 4,519,920 | 5/1985 | Fukumoto et al. | 210/701 |

FOREIGN PATENT DOCUMENTS

| | | |
|---|---|---|
| 0075820 | 4/1963 | European Pat. Off. |
| 0106110 | 4/1984 | European Pat. Off. |
| 0108909 | 5/1984 | European Pat. Off. |
| 3233776 | 3/1984 | Fed. Rep. of Germany |
| 3302168 | 7/1984 | Fed. Rep. of Germany |
| 842563 | 7/1960 | United Kingdom |

*Primary Examiner*—Christopher Henderson
*Attorney, Agent, or Firm*—Howson and Howson

[57] ABSTRACT

Very small amounts of certain metal ions promote copolymerization of aliphalic dicarboxylic acids with $\alpha,\beta$-ethylentically unsaturated monomers in an aqueous solution system maintained at a given pH range, whereby the amount of unreacted dicarboxylic acid monomer is significantly reduced while control of molecular weight of the resulting compolymers is maintained.

9 Claims, No Drawings

PREPARATION OF AQUEOUS SOLUTIONS OF COPOLYMERS OF DICARBOXYLIC ACIDS HAVING A LOW DICARBOXYLIC ACID MONOMER CONTENT

FIELD OF THE INVENTION

The present invention relates to the production of aqueous solutions or dispersions of copolymers of aliphatic dicarboxylic acids, especially maleic acid, with $\alpha,\beta$-ethylenically unsaturated monomers having carboxyl or sulfonic acid groups, such as (meth)acrylic acid or 2-acrylamido-2-methyl propane sulfonic acid (AMPS), respectively, which solutions or dispersions have a very low residual content of unpolymerized dicarboxylic acid monomer. Such copolymers are useful as antiscalants, dispersants, detergent additives, deflocculants and fluid retention aids for water-based drilling fluids used in oil drilling operations.

BACKGROUND OF THE INVENTION

Copolymers of aliphatic monoethylenically unsaturated mono- and dicarboxylic acids are well known and have been used as incrustation inhibitors and deflocculants in aqueous systems, and as builders in detergent compositions. Such copolymers have been prepared by copolymerizing a monoethylenically unsaturated aliphatic dicarboxylic acid, such as maleic acid, with one or more monoethylenically unsaturated monocarboxylic acids, and/or monoethylenically unsaturated sulfonic acids. Examples of monocarboxylic acid monomers are acrylic and methacrylic acid. These acid monomers are collectively referred to in the specification and appended claims as "(meth)acrylic acid".

Various processes for preparing such copolymers in an aqueous solvent system have been described in the literature. Thus, U.S. Pat. Nos. 3,806,367 and 3,898,037 disclose, inter alia, the preparation of copolymers of the disodium salt of maleic acid and acrylamido-sulfonic cid compounds, especially monomeric 2-acrylamido-2-methylpropane sulfonic acid in an aqueous system in the presence of an organic chain transfer agent such as isopropanol. Although the amount of residual maleic acid monomer is not stated, it is believed that the degree of conversion of monomer to copolymer is on the order of about 80 percent. In addition, the solids content of the resulting copolymer solution is on the order of 15 to 25 percent.

U.S. Pat. No. 4,314,044 discloses preparation of low molecular weight water soluble copolymers of acrylic and methacrylic acid with monoethylenically unsaturated dicarboxylic acids such as itaconic, fumaric and maleic acid, in an aqueous solvent system containing an initiator and a metal salt in which the molar ratio of initiator to metal ion of the salt is from 10:1 to 150:1, and the initiator is present in an amount of from 0.5 weight percent to 35 weight percent based on the weight of monomers present. Depending upon the monomers used, the degree of monomer conversion varies from about 75 to about 95 percent. Thus, the copolymer solution contains substantial amounts of unreacted monomer. The problem of unreacted residual monomer would be even greater with copolymers of maleic acid, a less reactive monomer.

Published German patent application No. P 31 38 574.5 discloses a process for the production of copolymers of monoethylenically unsaturated monocarboxylic acids with dicarboxylic acids in aqueous medium in the presence of a water soluble radical generating initiator, such as a peroxide, hydroperoxide or persulfate. In such process, to an aqueous solution of the partially neutralized salt of the dicarboxylic acid monomer there are added over a period of hours an aqueous solution of an $\alpha,\beta$-ethylenically unsaturated monocarboxylic acid monomer and an initiator, while the temperature of the reaction medium is maintained at about 60° C. to 150° C. During the polymerization 20% to 80% of the carboxyl groups of the monomers are neutralized. However, such process requires the use of large amounts of initiator and relatively high polymerization temperatures to obtain a copolymer solution containing a relatively low residual content of unpolymerized dicarboxylic acid monomer. The presence of dicarboxylic acid monomer in the aqueous polymer solution decreases the effectiveness of the copolymer in many uses, an example of which is as an encrustation inhibitor. In addition, the dicarboxylic acid monomer, e.g. maleic acid, physiologically is not a totally harmless substance.

In an effort to reduce the amount of residual unpolymerized dicarboxylic acid monomer it has been suggested to carry out the process of German Application No. P 31 47 489 in the presence of a water soluble radical generating initiator comprising a combination of hydrogen peroxide and a persulfate, the weight ratio of the former to the latter being from 3:1 to 1:3. See published European Application No. 01 06 110, the disclosure of which and that of the above-discussed German Application No. P 31 47 489 are incorporated herein by reference. Although such combination of initiators significantly reduces the residual content of unpolymerized dicarboxylic acid, the use of such process makes it difficult to obtain relatively high molecular weight copolymers while at the same time maintaining a high degree of monomer conversion.

SUMMARY OF THE INVENTION

The present invention is dirceted to an improvement in the above-type processes for the copolymerization of monoethylenically unsaturated dicarboxylic acids with $\alpha,\beta$-ethylenically unsaturated monomers, expecially those having a carboxyl or sulfonic acid group, whereby the residual content of the dicarboxylic acid in the aqueous solvent system used in the polymerization is significantly reduced so as not to exceed about 0.5 percent, based on the total weight of dried copolymers. Stated differently, the present process makes possible conversion of at least 99.5 percent of dicarboxylic acid monomer. Generally, the residual dicarboxylic acid monomer content is reduced to 0.3 percent or less. Such result is obtained by carrying out the polymerization in a particular pH range and in the presence of a small amount, generally on the order of 1 to 250 ppm, of certain metal ions, typical examples of which are ferric and ferrous ions.

DETAILED DESCRIPTION OF THE INVENTION

It was discovered that if the copolymerization of $\alpha,\beta$-monoethylenically unsaturated aliphatic monomers containing a carboxyl or sulfonic acid group with dicarboxylic acids is carried out in an aqueous solvent system at a given pH range and in the presence of a water soluble radical generating initiator and a small amount of certain metal ions, the content of residual unreacted dicarboxylic acid in the resulting aqueous copolymer solution could be reduced to an extremely low level on the order of not more than about 0.5 percent, by weight, based on the total weight of dried copolymers. Depending upon polymerization conditions used, according to the present invention the dicarboxylic acid monomer content can be reduced to less than 0.1 percent. In addition, the novel process makes possible control of molecular weight and the molar ratio of dicarboxylic acid monomer to $\alpha,\beta$-ethylenically unsaturated monomer of the resulting copolymers independently of residual unreacted dicarboxylic acid monomer.

The metal ions used in the process may be selected from the group consisting of $Zn^{++}$, $Co^{+++}$, $Co^{++}$, $Cu^{++}$, $Mo^{++}$, $Fe^{+++}$, $Fe^{++}$, $Cr^{+++}$, $Ni^{++}$, $Ce^{++++}$ and $Ce^{++}$. Mixtures of such ions may also be used.

The concentration of metal ions in the aqueous solvent system should be a small amount effective to reduce the residual content of the residual unpolymerized monoethylenically unsaturated dicarboxylic acid in the aqueous copolymer solution so as not to exceed about 0.5 percent, by weight of dried polymers produced in the polymerization process. The metal ion concentration may vary from about 1 to about 250 ppm, based on the total aqueous polymerization system, including monomers and initiator. Generally, by maintaining the molar ratio of metal ion to initiator in the range of from about 1:4000 the residual dicarboxylic acid content may be reduced to 0.5 percent or less. Preferably the metal ions are present at a concentration of from about 1 to 5 ppm.

The metal ions may be added to the aqueous solvent system in the form of their salts and oxides which are soluble in aqueous solvent system. Suitable water soluble salts include zinc nitrate, zinc sulfate, zinc chloride, cupric acetate, cupric chloride, molybdenous chloride, cobalt (II) acetate, cobalt (II) nitrate, cobalt (III) chloride, ferric chloride, ferric sulfate, ferrous sulfate, chromium (II) acetate, chromium (II) chloride, nickel (II) sulfate, cerium (IV) sulfate, and cerium (II) nitrate. Preferably, these salts are added to the aqueous solvent system in the form of an aqueous solution of the desired concentration.

The monoethylenically unsaturated aliphatic dicarboxylic acids used in the present process contain from 4 to 6 carbon atoms, examples of which are maleic acid, itaconic acid, mesaconic acid, fumaric acid, methylene malonic acid, citraconic acid and their monoalkali metal or monoammonium salts. Depending upon the geometrical location of the carboxyl groups (cis position), they may be added to the aqueous solvent system in the form of their anhydrides, maleic anhydride being typical of such anhydrides. The dicarboxylic acid monomer will generally comprise from about 10 to about 70 percent, preferably 25 to 55 percent, by weight of total monomers.

The $\alpha,\beta$-ethylenically unsaturated monomers which are copolymerized with the dicarboxylic acid monomers according to the process of this invention are of three particular types, namely, (a) aliphatic monocarboxylic acids having 3 to 10 carbon atoms and the alkali metal and ammonium salts of such acids; (b) organic sulfonic acid compounds and the alkali metal and ammonium salts thereof, and (c) vinyl monomers free of carboxyl and sulfonic acid groups, and mixtures of such (a), (b) and (c) monomers. The (a), (b) and (c) monomers comprise from about 90 to about 30 percent, preferably 45 to 75 percent, of said copolymers, based on the total weight of monomers. However, for solubility reasons, preferably some of the (c) monomers do not comprise more than about 30 percent of the total monomers, the remainder of the monomers being either the dicarboxylic acid or a mixture of dicarboxylic acid and (a) and/or (b) type monomers in the above-stated proportions.

The (a) type monomers include acrylic and lower alkyl substituted acrylic acid such as methacrylic acid, acrylic and methacrylic acid being referred to collectively herein as "(meth)acrylic" acid, vinyl acetic acid, and the like, and the alkali metal, e.g. sodium and potassium, and ammonium salts of such monocarboxylic acids.

The (b) type monomers include sulfonic acid monomers, such as vinylsulfonic acid, allylsulfonic acid, methallylsulfonic acid, styrene sulfonic acid, vinyltoluenesulfonic acid and the alkali metal and ammonium salts of such sulfonic acids, as well as sulfonic acid compounds of the formula

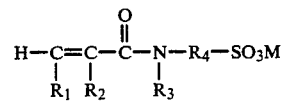

where $R_1$, $R_2$ and $R_3$ are each selected from the group consisting of hydrogen and lower alkyl, $R_4$ is lower alkylene or alkyl substituted lower alkylene, and M is hydrogen, an alkali metal or ammonium ion.

The acrylamido alkyl sulfonic acid monomers of the above formula can be prepared by well-known processes which are described in U.S. Pat. No. 3,506,707 and the patents referred to therein.

Although various derivatives which are included within the structural formula set forth above may be prepared, the monomer which has been found to be particularly suitable for use in the process of this invention is 2-acrylamido-2-methylpropane sulfonic acid, or a salt thereof, commonly referred to as "AMPS", having the formula

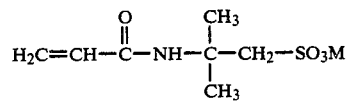

where M represents hydrogen, sodium, potassium and ammonium.

The third type monomer copolymerizable with the dicarboxylic acid monomer, and monomer types (a) and (b) if also present, are the vinyl monomers (c), which are free of carboxyl and sulfonic acid groups. Typical of such monomers are vinyl acetate, allyl alcohol, acrylamide, N,N$^1$-dimethylacrylamide, N-methylolacrylamide, N,N$^1$-methylenebisacrylamide, vinyl crotonate, ethylene glycol diacrylate, tripropylene glycol diacrylate, diallylphthalate, hydroxyethyl acrylate, hydroxyethyl methacrylate, hydroxypropyl acrylate, vinyl pyrrolidone and N-vinyl-N-methyl-acetamide. As noted previously, in order that the copolymers will have adequate water solubility, some of the type (c) monomers should comprise not more than 30 percent of total monomers employed to form the copolymers.

The copolymerization reaction is carried out in the presence of a water soluble, radical generating initiator. Such polymerization initiators are well known and include peroxides such as hydrogen peroxide, hydroperoxides such as t-butylhydroperoxide, and persulfates such as sodium, potassium and ammonium persulfate. Water-soluble azo initiators, such as 2,2¹-azobis(2-amidinopropane)hydrochloride can also be used. A particularly effective initiator is hydrogen peroxide.

The amount of initiator employed generally will be from about 0.5 to about 10 percent, by weight of total monomers. A redox system can be used where lower polymerization temperatures are used. Using a redox system requires purging of the aqueous solution(s) of monomers with an inert gas, such as nitrogen. Suitable reducing agents are ascorbic acid and erythorbic acid.

According to a preferred embodiment of the invention an aqueous solution of the monoalkali metal or monoammonium salt of the dicarboxylic acid monomer is placed in a suitable reactor and one or more water soluble salts of the above-described metal ions, generally as aqueous solutions, are added thereto. Then aqueous solutions of one or more of the (a), (b) and (c) monomers are added to the reactor over a period of several hours, e.g. 3 to 10 hours, and preferably 5 to 7 hours while maintaining the pH of the system in the range of from about 2 to about 7. Addition of initiator is made in similar fashion as a separate aqueous solution. During the polymerization reaction, the aqueous solvent system containing the monomers and initiator is maintained at a temperature of from about 40° to about 150° C., preferably 80° C. to about 100° C., and at a pH of from 2.0 to 7.0, preferably pH 3 to 5. If the temperature of the reaction mixture exceeds the boiling point thereof, the reaction may be carried out under pressure.

An important factor in maintaining residual unreacted dicarboxylic acid monomer is pH of the aqueous solvent system during the polymerization reaction. Where the molar ratio of dicarboxylic acid monomer to monocarboxylic and/or sulfonic acid monomers is relatively low, e.g. 1:4 to 1:3, the degree of neutralization of the latter monomers is relatively low, calling for a pH of the polymerization system of from about 2 to 4. On the other hand, where such molar ratio is relatively high, e.g. 1:1.5 to 1:1, a pH of from about 4 to 6 is desirable. A pH in these specified ranges can be maintained by neutralizing or partially neutralizing the monocarboxylic or monosulfonic acid monomer solution which is added to the dicarboxylic acid monomer solution.

The process is carried out in the absence of organic chain transfer agents, such as isopropanol, which limit the solids content of aqueous solutions of the copolymers to about 25 percent and result in high percentages of unreacted dicarboxylic acid monomer.

As the completion of the polymerization reaction, the free carboxyl groups on the copolymer can be neutralized by addition of a suitable base, such as sodium hydroxide.

The copolymers obtained according to the process of this invention will have a weight average molecular weight of from about 2000 to 1,000,000. By having metal ions present at a concentration of about 10 ppm or somewhat higher, lower molecular weight copolymers within the above-stated molecular weight range can be obtained.

The copolymer solutions produced according to this invention ordinarily will have a solids content of the order of 30 to about 60 percent, by weight, and can be used directly in such applications as pigment and coal slurry dispersants, antiscalants, incrustation inhibitors, oil drilling mud thinners and fluid loss agents.

The following examples are presented to illustrate the preparation of copolymers according to process of this invention, and are presented by way of illustration and are not to be construed as limiting the scope of this invention which is defined in the appended claims. In the examples molecular weights were determined by gel permeation chromatography (GPC) using polyacrylic acid of known molecular weight as the standard for molecular weight calibration. Residual monomer in the aqueous solution system at the completion of the copolymerization was determined by high performance liquid chromatography (HPLC), and for each example the amount of residual unreacted dicarboxylic acid monomer is set forth in Table I, together with process conditions employed.

EXAMPLE 1

(Comparative example)

To a 5-neck, 3000 ml round bottom flask equipped with a mechanical stirrer, reflux condenser, and graduated addition funnels for continuous addition of monomers and initiator were charged 264 g distilled water and 150 g (1.5 mols) maleic anhydride hydrolyzed to maleic acid after being dissolved with agitation. To the resulting maleic acid solution were added 125 g (1.56 mols) caustic soda (50%), and the resulting solution of monosodium maleate was heated to a temperature of 90±4° C. Five grams of erythorbic acid in 30 g distilled water, 28 g. hydrogen peroxide (35% active) in 100 g distilled water, and a mixture of partially neutralized acrylic acid solution consisting of 350 g (4.81 mols) acrylic acid, 195 g (2.43 mols) caustic soda (50%) and 180 g distilled water were each added separately into the flask at a constant rate over a period of 6 hours while the polymerization temperature was held between 86° and 100° C. The reaction mixture was refluxed for an additional 2 hours and then cooled to room temperature. The resulting copolymer solution contained 46%, by weight, of solids. Further neutralization of the copolymer was carried out by adding 210 g caustic soda (50%) to bring the pH value of polymer solution to 7.

EXAMPLE 2

The procedure of Example 1 was repeated except that 0.040 g of ferrous ammonium sulfate hexahydrate (5 ppm Fe++ ion) was added to the aqueous solution of monosodium maleate prior to carrying out the polymerization reaction.

EXAMPLE 3

To a 4-neck, 3000 ml round bottom flask equipped as in Example 1 were charged 294 g (3 mols) maleic anhydride and 425 g distilled water. Two hundred and forty grams (3 mols) of caustic soda (50%) were then used to partially neutralize the aqueous solution of maleic acid. Then 0.125 g of ferrous ammonium sulfate hexahydrate were added to the partially neutralized maleic acid solution and the reaction vessel was heated to 92°±6° C.

Forty-seven grams of hydrogen peroxide (35% active) in 90 g of distilled water, and a mixture of partially neutralized acrylic acid solution comprising 324 g (4.5 mols) acrylic acid, 180 g (2.25 mols) caustic soda (50%) and 200 g of distilled water were each added separately to the flask at a constant rate over a period of 8 hours while the polymerization temperature was held between 90° to 102° C. The reaction mixture was refluxed for an additional 2 hours and cooled to room temperature. Further neutralization was accomplished by adding 276 g of caustic soda (50%) to provide the copolymer solution with a pH of 7.3.

ppm $Fe^{++}$ ion) and 1934 g (4.2 mols) of an aqueous solution of the sodium salt of AMPS (50% active) were used. Both ferrous ion and AMPS solutions were added to the partially neutralized maleic acid solution in the same manner as described in Example 4.

TABLE I

| Sample No. | Monomer System (Molar Ratio) | Metal Ion Added | Residual Monomers[a] (% by wt. of dried copolymer) | | Wt. Average Molecular Wt. |
|---|---|---|---|---|---|
| | | | Maleic Acid or Maleic + Fumaric Acid | AMPS | |
| 1[b] | maleic acid/ acrylic acid = 1/3.2 | No | 1.52 | — | 25,000–40,000 |
| 2 | maleic acid/ acrylic acid = 1/3.2 | 5 ppm | 0.03 | — | 20,000–35,000 |
| 3 | maleic acid/ acrylic acid = 1/1.5 | 26 ppm | 0.28 | — | 5,000–10,000 |
| 4 | maleic acid/ AMPS = 1/1 | 40 ppm | 0.11 | <0.1 | 8,000–16,000 |
| 5[b] | maleic acid/ AMPS = 1/1 | No | 3.33 | <0.1 | 10,000–24,000 |
| 6 | maleic acid/ AMPS/acrylic acid = 1.5/1/1.5 | 40 ppm | 0.10 | <0.1 | 8,000–18,000 |
| 7 | maleic acid/ AMPS = 1/2 | 40 ppm | 0.10 | <0.1 | 8,000–18,000 |

[a] The monomer conversion rate for acrylic acid is almost 100%.
[b] Comparative examples.

EXAMPLE 4

To a 4-neck, 3000 ml round bottom flask equipped as in Example 1 were charged 250 g distilled water and 206 g (2.1 mols) maleic anhydride. One hundred and sixty-eight grams (2.1 mols) of caustic soda (50%) were used to partially neutralize the aqueous solution of maleic acid. Then 0.20 g of ferrous ammonium sulfate hexahydrate were added to the partially neutralized maleic acid solution and the reaction vessel was heated to 95°±3° C.

40 g of hydrogen peroxide (35% active) in 138 g of distilled water and 967 g (2.1 mols) of an aqueous solution of the sodium salt of AMPS (50% active) were each added separately to the flask at a constant rate over a period of 8 hours while the polymerization temperature was held between 96° to 102° C. The reaction mixture was refluxed for an additional 2 hours and then cooled to room temperature. Further neutralization was done by adding 50 g of caustic soda (50%) to provide the copolymer solution with a pH of 7.

EXAMPLE 5

(comparative)

The procedure of Example 4 was repeated except that the ferrous salt was omitted.

EXAMPLE 6

The procedure of Example 4 was repeated except 642 g (1.4 mols) of an aqueous solution of the sodium salt of AMPS (50% active) were mixed with 152 g (2.1 mols) of acrylic acid, 134 g (1.68 mols) of caustic soda (50%), and 135 g of distilled water. This monomer mixture of AMPS and acrylic acid was then added to the partially neutralized maleic acid solution in the same manner as described in Example 4.

EXAMPLE 7

The procedure of Example 4 was repeated except 0.33 g of ferrous ammonium sulfate hexahydrate (40

EXAMPLE 8

(Incrustation Inhibition)

The purpose of this example is to illustrate the anti-incrustation properties of detergent compositions containing copolymers produced by the process of the present invention. In each case the detergent composition used had the formulation given in Table II below; however, a different copolymer was used in each example and these are identified in Table III.

TABLE II

| Detergent Composition | |
|---|---|
| Component | Weight Percent |
| Sodium Carbonate | 52 |
| Sodium silicate (2.4:1) | 7 |
| Carboxymethylcellulose | 1 |
| Nonionic surfactant | 5 |
| Copolymer | 5 |
| Sodium sulfate | qs |

In the tests which provided the data presented in Table III, the detergent level was 0.15 percent, by weight, and five cycles were used. The water had a hardness of 110 ppm ($CaCO_3$), and the wash temperature was 50° C.

The detergent compositions of Table II were prepared by dry mixing all ingredients except the copolymers. The appropriate amount of copolymer and dry mixed powder were then dissolved in water at 10% total active detergent.

The procedure for the laundry cycle was as follows:

For each test, one 9"×9" cotton percale sheeting swatch was placed in 500 ml wide-mouthed plastic bottle and 400 ml of the water at the appropriate temperature were added. 6 ml of 10% detergent solution (0.6 g active, 0.15%) was added, and the bottle was capped and rolled end to end at 45 rpm for 20 minutes. To rinse, wash water was drained from each bottle, except for 10% (40 ml) which remained in the bottles. 360 ml of water at ambient temperature were added and the bottle was capped and rolled 5 minutes more. The swatch was then wrung to 100% water pick-up and air dried.

After 5 cycles described as above, a portion of the swatch weighing 0.5 to 1 g was weighed to the nearest mg, placed in a beaker with 20 ml of 5% acetic acid, and held at 80°-90° C. for 1 hour. The acid solution was drained from the cottom swatch, and the swatch was washed with 5 ml of 1% acetic acid, adding the washings to the acid solution. The acid solution was neutralized with ammonia to pH 10 and titrated with $5 \times 10^{-3}$M EDTA, using either the calcium specific ion electrode or Eriochrome Black T as indicator. The end points from the two methods were the same.

The results were determined using the below formula and reported as % CaCO$_3$ on the fabric:

$$\% \text{ CaCO}_3 = \frac{Ml \text{ } EDTA \times M \text{ } EDTA \times 100 \times 10^{-1}}{\text{wt swatch sample}}$$

The results obtained are set forth in Table III below:

TABLE III

Calcium Deposits on Cotton Percale Laundered with Detergents Containing Acrylic Acid-Maleic Acid Copolymers

| Copolymer of Example No. | Copolymer Molar Ratio (Maleic acid/acrylic acid) | Wt. %[a] CaCO$_3$ | Hand[b] |
|---|---|---|---|
| 1[c] | 1/3.2 | 0.77 | 3 |
| 2 | 1/3.2 | 0.54 | 4 |
| 3 | 1/1.5 | 0.29 | 4 |
| Control (no polymer) | — | 1.11 | 1 |

[a]Calcium deposits on the cloth, calculated at CaCO$_3$
[b]Hand is ranked from 5 (smooth) to 1 (harsh).
[c]Comparative example.

The copolymers produced by the process of this invention are also useful as deflocculants for oil well drilling fluids, which use is the subject matter of another related application.

I claim:

1. In the process for the manufacture of water-soluble copolymers of a monoethylenically unsaturated dicarboxylic acid having from 4 to 6 carbon atoms and an α,β-ethylenically unsaturated monomer, said copolymers having a weight average molecular weight of from about 2,000 to about 1,000,000, in which said dicarboxylic acid which is at least partially neutralized is reacted with an α,β-ethylenically unsaturated monomer selected from the group consisting of (a) a monocarboxylic acid having from 3 to 10 carbon atoms and the alkali metal and ammonium salts thereof, (b) an organic sulfonic acid compound and the alkali metal and ammonium salts thereof, and (c) a vinyl monomer free of carboxyl and sulfonic acid groups, and mixtures of said (a), (b) and (c) monomers, at an elevated temperature in an aqueous polymerization system substantially free of an organic chain transfer agent, and in which said dicarboxylic acid is first dissolved in said aqueous polymerization system and is at least partially neutralized, and said α,β-ethylenically unsaturated monomer or monomers and a water-soluble initiator are added to said aqueous polymerization system during a period of from 3 to 10 hours, the total amount of monomers employed in said reaction comprising at least about 30 percent, by weight, of said aqueous polymerization system, the improvement which comprises reacting from about 25 to about 55 percent by weight, based on total weight of monomers, of said dicarboxylic acid with from about 45 to about 75 percent of any of said monomers (a), (b) and (c), and mixtures thereof, and carrying out said polymerization reaction at a temperature of from about 80° to about 100° C. in the presence of from about 1 to about 250 ppm, of a metal ion selected from the group consisting of $Zn^{++}$, $Co^{+++}$, $Co^{++}$, $Cu^{++}$, $Mo^{++}$, $Fe^{+++}$, $Fe^{++}$, $Cr^{+++}$, $Ni^{++}$, $Ce^{++++}$ and $Ce^{++}$, based on the total weight of the aqueous polymerization system, said concentration of said metal ions being increased proportionally with increase in the molar ratio of said dicarboxylic acid monomer to the total of said (a), (b) and/or (c) monomers, the pH of said polymerization system being maintained in the range of from about 2 to about 4 when the molar ratio of dicarboxylic acid monomer to other monomers is from about 1:4 to about 1:3, and from about 4 to about 6 when the molar ratio of dicarboxylic acid monomer to other monomers is from about 1:1.5 to about 1:1.

2. The process according to claim 1 in which the molar ratio of metal ion to initiator is in the range of from about 1:300 to about 1:4000.

3. The process according to claim 1 in which said (b) monomer is selected from the group consisting of vinylsulfonic acid, allylsulfonic acid, methallylsulfonic acid, styrenesulfonic acid, vinyltoluenesulfonic acid and the alkali metal and ammonium salts thereof, and a compound of the formula

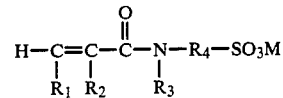

wherein $R^1$, $R^2$ and $R^3$ are selected from the group consisting of hydrogen and lower alkyl, $R^4$ is lower alkylene or alkyl substituted lower alkylene, and M is hydrogen, an alkali metal or ammonium ion.

4. The process according to claim 1 in which said (c) monomer is selected from the group consisting of vinyl acetate, allyl alcohol, acrylamide, N,N$^1$-dimethylacrylamide, N-methylolacrylamide, N,N$^1$-methylenebisacrylamide, vinyl crotonate, ethylene glycol diacrylate, tripropylene glycol diacrylate, diallylphthalate, hydroxyethyl acrylate, hydroxyethyl methacrylate, hydroxypropyl acrylate, vinyl pyrrolidone and N-vinyl-N-methyl-acetamide.

5. The process according to claim 1 in which an aqueous solution of a mixture of said (a), (b) and (c) monomers is added to said aqueous solution system.

6. The process according to claim 1 in which said water-soluble initiator is selected from the group consisting of hydrogen peroxide, t-butylhydroperoxide, sodium, potassium and ammonium persulfate, and 2,2$^1$-azobis(2-amidinopropane)hydrochloride, and is present in an amount of from about 0.5 to about 10 percent, said percentages being by weight based on the total weight of monomers used in the process.

7. The process according to claim 1 in which said dicarboxylic acid monomer is maleic acid, a monoalkali metal maleate or a monoammonium maleate.

8. The process according to claim 1 in which from about 1 to about 5 ppm of said metal ion is present in said aqueous solution system.

9. The process according to claim 6 in which said initiator comprises hydrogen peroxide.

* * * * *